United States Patent
Wojnar et al.

(10) Patent No.: US 11,804,899 B2
(45) Date of Patent: Oct. 31, 2023

(54) VEHICLE COMMUNICATION SYSTEM

(71) Applicant: THE BOEING COMPANY, Chicago, IL (US)

(72) Inventors: Joel Thomas Wojnar, Lake Stevens, WA (US); Michael Gary Reinbold, Everett, WA (US); Dennis M. Lewis, Everett, WA (US)

(73) Assignee: The Boeing Company, Arlington, VA (US)

(*) Notice: Subject to any disclaimer, the term of this patent is extended or adjusted under 35 U.S.C. 154(b) by 410 days.

(21) Appl. No.: 16/786,081

(22) Filed: Feb. 10, 2020

(65) Prior Publication Data

US 2021/0250095 A1    Aug. 12, 2021

(51) Int. Cl.
*H04B 10/2575*   (2013.01)
*H04B 10/27*     (2013.01)
*H04B 10/114*    (2013.01)

(52) U.S. Cl.
CPC ..... *H04B 10/25752* (2013.01); *H04B 10/114* (2013.01); *H04B 10/27* (2013.01)

(58) Field of Classification Search
CPC .............. H04B 10/2575; H04B 10/25752
See application file for complete search history.

(56) References Cited

U.S. PATENT DOCUMENTS

| | | | |
|---|---|---|---|
| 10,425,150 B1* | 9/2019 | Earnhardt, Jr. | H05K 7/14 |
| 2014/0352913 A1* | 12/2014 | Eowsakul | B64D 13/06 |
| | | | 165/11.1 |
| 2016/0301453 A1* | 10/2016 | Sanderovich | H04B 7/08 |
| 2017/0257165 A1* | 9/2017 | Pescod | H04B 10/2575 |
| 2019/0306030 A1* | 10/2019 | Chen | H04B 7/0413 |
| 2019/0346738 A1* | 11/2019 | Takeyama | G02F 1/3501 |

\* cited by examiner

*Primary Examiner* — Shi K Li
(74) *Attorney, Agent, or Firm* — THE SMALL PATENT LAW GROUP LLC; Philip S. Hof

(57) ABSTRACT

A vehicle communication system includes an optical cable, a centralized hub device, and an antenna hub device. The centralized hub device is connected to a first end of the optical cable and is configured to receive radio frequency (RF) signals from multiple end devices. The centralized hub device is configured to convert the RF signals to respective optical carrier signals and transmit the optical carrier signals along the optical cable at different, non-overlapping wavelength bands of a combined optical signal. The antenna hub device is connected to a second end of the optical cable. The antenna hub device is configured to receive the combined optical signal and to convert the optical carrier signals thereof to RF signals, amplify the RF signals, and transmit the RF signals to one or more antennas.

17 Claims, 4 Drawing Sheets

VEHICLE COMMUNICATION SYSTEM

FIELD OF THE DISCLOSURE

Embodiments of the present disclosure generally relate to communications to and from vehicles.

BACKGROUND

Modern vehicles include antennas for communicating with off-board devices, such as satellites, other vehicles, cellular towers, dispatch facilities, and the like. The antennas transmit and receive radio frequency (RF) signals. Conventionally, the onboard end devices that generate and/or receive the RF signals, such as radios, GPS receivers, routers, transponders, and/or the like, are electrically connected to corresponding antennas via respective coaxial cables. Coaxial cables have limited bandwidth, significant signal loss, and susceptibility to noise and interference. Due to the signal loss and susceptibility to signal degradation, conventional systems substantially amplify the RF signals to satisfy designated signal quality standards (e.g., signal-to-noise). To limit signal loss and the energy expended for amplification, the end devices are often located proximate to the antennas. The area of the vehicle near the antennas may not be able to accommodate the end devices, however, due to be space limitations and/or inaccessibility. Furthermore, the area near the antennas may not provide a desirable operating environment for the end devices. For example, the area may have limited access to cooling air flow for heat dissipation and may experience harsh temperatures. Installing the end devices farther away from the antennas in a more convenient area of the vehicle (based on space, accessibility, operating conditions, and the like) has the associated costs of increased signal loss and reduced energy efficiency.

SUMMARY OF THE DISCLOSURE

In one or more embodiments of the present disclosure, a vehicle communication system is provided that includes an optical cable disposed on a vehicle, a centralized hub device, and an antenna hub device. The centralized hub device includes an optical port connected to a first end of the optical cable. The centralized hub device is operably connected to multiple end devices on the vehicle and is configured to receive radio frequency (RF) signals from the end devices. The centralized hub device is configured to convert the RF signals to respective optical carrier signals and transmit the optical carrier signals along the optical cable at different, non-overlapping wavelength bands of a combined optical signal. The antenna hub device includes an optical port connected to a second end of the optical cable. The antenna hub device is operably connected to one or more antennas on the vehicle. The antenna hub device is configured to receive the combined optical signal and to convert the optical carrier signals thereof to RF signals, amplify the RF signals, and transmit the RF signals to the one or more antennas.

In one or more embodiments of the present disclosure, a method for communicating signals onboard a vehicle is provided. The method includes receiving radio frequency (RF) signals at a centralized hub device from multiple end devices on the vehicle and converting the RF signals to respective optical carrier signals via the centralized hub device. The method includes transmitting the optical carrier signals from the centralized hub device through an optical cable that is connected to both the centralized hub device and an antenna hub device. The optical carrier signals are transmitted through a single optical fiber of the optical cable at different designated wavelength bands. The method also includes receiving the optical carrier signals at the antenna hub device, converting the optical carrier signals at the designated wavelength bands to RF signals, and transmitting the RF signals from the antenna hub device to different corresponding antennas on the vehicle for communication of the RF signals.

In one or more embodiments of the present disclosure, an aircraft is provided that includes multiple antennas, multiple end devices, and a vehicle communication system. The antennas are disposed along an exterior surface of the aircraft. The end devices are disposed within an equipment compartment of the aircraft. The vehicle communication system is onboard the aircraft and connects the end devices to the antennas. The vehicle communication system includes an optical cable, a centralized hub device, and an antenna hub device. The centralized hub device is connected to a first end of the optical cable and disposed within the equipment compartment. The centralized hub device is configured to receive radio frequency (RF) signals from the end devices, convert the RF signals to respective optical carrier signals, and transmit the optical carrier signals through a single optical fiber of the optical cable at different designated wavelength bands that are non-overlapping. The antenna hub device is connected to a second end of the optical cable and configured to receive the optical carrier signals from the optical cable. The antenna hub device is configured to convert the optical carrier signals to RF signals, amplify the RF signals, and transmit the RF signals to the antennas.

BRIEF DESCRIPTION OF THE DRAWINGS

These and other features, aspects, and advantages of the present disclosure will become better understood when the following detailed description is read with reference to the accompanying drawings in which like numerals represent like parts throughout the drawings, wherein.

DETAILED DESCRIPTION OF THE DISCLOSURE

Figure 1:
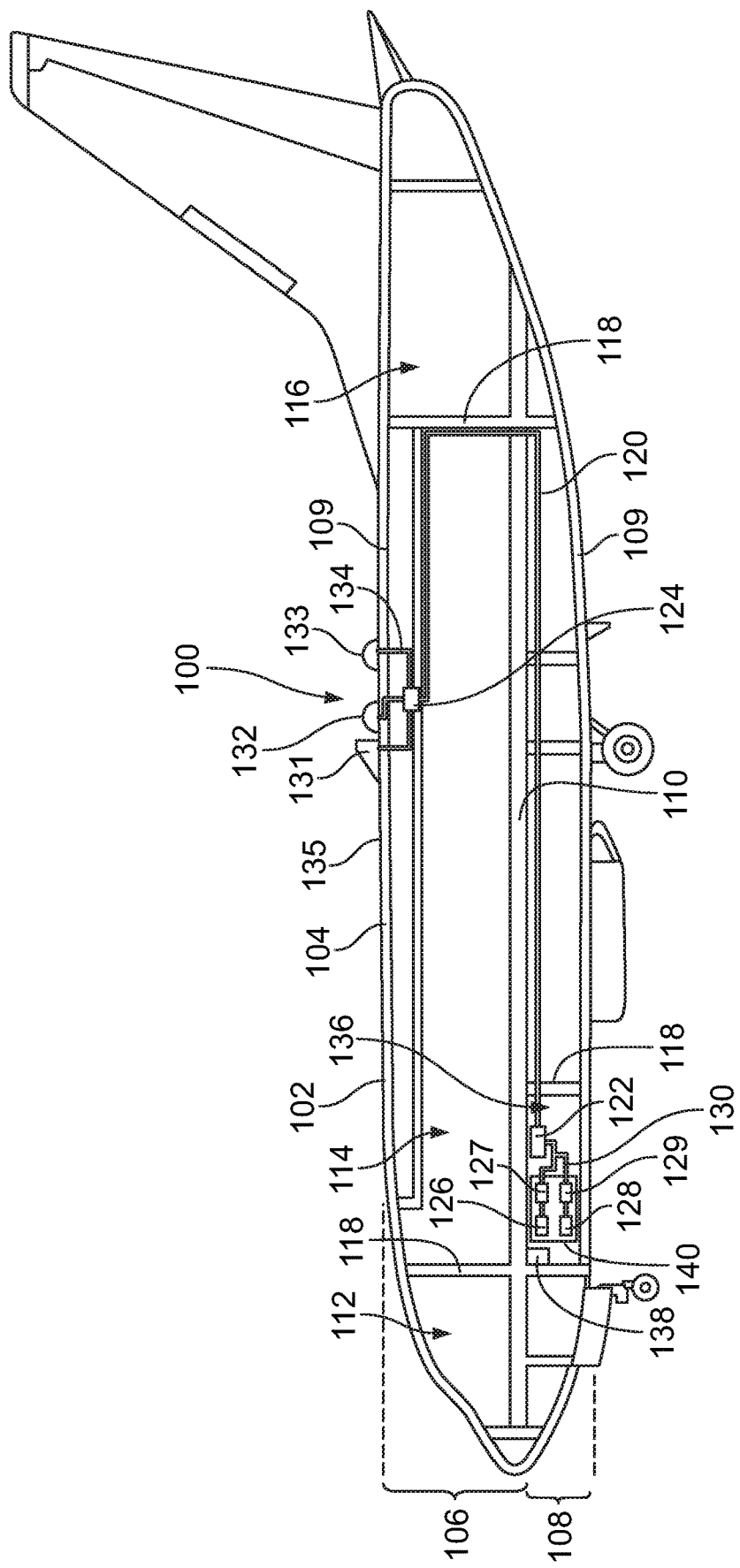
FIG. 1 illustrates a vehicle communication system according to an embodiment of the present disclosure installed on an aircraft.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Embodiments of the present disclosure provide a vehicle communication system and method for transmitting vehicle communications that utilize radio frequency over fiber technology. The system can be used to transmit different types of RF signals (e.g., Ku, Ka, 802.11, HF, VHF, Cellular, SATCOM, and the like) via an optical (e.g., fiber-optic) cable to one or more associated antennas for different vehicle communications.

The system includes a first hub device that multiplexes multiple RF signals into a combined optical signal for transmission over the optical cable. The combined optical signal includes optical carrier signals transmitted at different, non-overlapping wavelength band. Each of the optical carrier signals represents a different one of the RF signals. The RF signals may be signals The first hub device is operably connected (e.g., via respective communication links or pathways) to multiple end devices onboard the vehicle. The end devices can include radios, location determining devices, routers, modems (e.g., modem cards), transponders, and the like. In one or more embodiments, the first hub device combines RF signals from several radios and/or other end devices for transmission over a single optical fiber. A second hub device is located proximate to the one or more antennas and is connected to the optical cable. The second hub device receives the combined optical signal, splits or partitions the signal into the constituent optical carrier signals based on the different wavelength bands, and converts the optical carrier signals back to RF signals. The second hub device then amplifies the RF signals and forwards the amplified RF signals to the appropriate antennas for communication. The antennas communicate RF signals remotely to a satellite, another vehicle, land-based equipment, a dispatch facility, or the like, and may also communicate RF signals locally to onboard wireless devices (e.g., personal computers of passengers).

Installing the radio frequency over fiber based communication system onboard a vehicle provides several benefits over existing connectivity systems that utilize coaxial cables to relay signals between the end devices and the antennas. At least one technical effect is improved signal quality because optical fibers have very low loss and are not susceptible to noise, electromagnetic interference, or radio frequency interference. Another technical effect is greater flexibility in the placement of the communication end devices relative to known systems that have to be near the antennas due to the limitations associated with coaxial cables. For example, due to the use of optical signal transmission, the first hub device and communication end devices can be located far apart from the antennas on the vehicle, such as in a vehicle compartment that provides desired operating conditions for the devices and enables easy access to the devices for installation and maintenance. Yet another technical effect of the system disclosed herein is improved energy efficiency by reducing the number of powered hardware devices relative to conventional connectivity systems and/or using very low loss fiber optics instead of coaxial cables for spanning a majority of the distance between end devices and antennas. The system disclosed herein can easily accommodate updates. For example, optical fibers have a large bandwidth and are able to transmit a multitude of bidirectional communications.

Another technical effect of the system disclosed herein is reduced weight attributable to using fewer and lighter components to transmit the signals from the end devices to the antennas. For example, conventional systems may have multiple hardware devices (e.g., servers with modem cards) dedicated to each of different types of RF communications, and each of the hardware devices may be connected via one or more coaxial cables to corresponding antennas. The system disclosed herein communicates multiple different types of RF signals utilizing a single centralized hub device. Furthermore, the centralized hub device is connected to the antenna hub device via only a single optical cable. Not only is optical cable lighter than coaxial cable, but by multiplexing multiple signals on a single optical cable, the single optical cable can replace multiple coaxial cables, further enhancing the weight savings. Weight saving is desirable for many types of vehicles to improve fuel efficiency and is particularly attractive for aviation vehicles (e.g., aircraft, space shuttles, helicopters, and the like).

FIG. 1 illustrates a vehicle communication system 100 according to an embodiment installed on an aircraft 102. The aircraft 102 represents a passenger aircraft. The aircraft 102 is shown in cross-section. The cross-section line bisects a fuselage 104 of the aircraft 102. The fuselage 104 defines an interior cabin 106 and a cargo hold 108 that are defined within outer walls 109 of the fuselage 104. The cargo hold 108 is located below a floor 110 of the interior cabin 106. The interior cabin 106 may include a cockpit 112, a passenger section 114, an aft section 116. The passenger section 114 may be sub-divided into one or more passenger sub-sections (for example, first class, business class, and coach sections) and one or more workstations (for example, galleys, personnel carry-on baggage areas, and the like). Each of the sections and sub-sections may be separated by partition walls 118. Overhead stowage bin assemblies may be positioned throughout the passenger section 114 of the interior cabin 106.

The aircraft 102 includes multiple different antennas for RF communications to and from the aircraft 102. The antennas are associated with different communication end devices onboard the aircraft 102 that send and receive messages, via the respective antennas, to corresponding off-board devices. For example, the end devices can include various radios and communication equipment, such as voice communication radios (e.g., high frequency (HF), very high frequency (VHF), and/or ultra-high frequency (UHF)), weather radar devices, automatic direction finding (ADF) receivers, transponders, radio altimeters, global positioning system (GPS) receivers, satellite communication (SATCOM) radios, wireless (Wi-Fi) routers, modems, and the like. The aircraft 102 can utilize the end devices and associated antennas to communicate with satellites, dispatch facilities, airports, weather service facilities, other aircraft, and the like.

The vehicle communication system 100 is disposed on the aircraft 102 and communicatively couples at least some of the onboard communication end devices to the associated antennas. The vehicle communication system 100 includes an optical cable 120, a centralized hub device 122, and an antenna hub device 124. The optical cable 120 is mechanically and communicatively connected to both the centralized hub device 122 and the antenna hub device 124. The optical cable 120 includes one or more optical fibers (or strands). In an embodiment, the optical cable 120 is a single fiber cable that includes only one optical fiber (e.g., one core and cladding). Alternatively, the optical cable 120 may include multiple fibers.

The centralized hub device 122 is operably (e.g., communicatively) connected to multiple communication end devices 126, 127, 128, 129. In a non-limiting example, the end devices 126-129 in FIG. 1 can represent a first voice communication radio 126, a second voice communication radio 127, a GPS device (e.g., transmitter and/or receiver)

128, and a transponder 129. The centralized hub device 122 is disposed relatively close to the end devices 126-129, such as within five meters of the end devices 126-129. The centralized hub device 122 may be individually connected to each of the end devices 126-129 via electrically conductive elements 130. The electrically conductive elements 130 may include or represent coaxial cables, copper wires, Ethernet cables, electrically conductive bus bars, circuit boards, and/or the like. Optionally, the centralized hub device 122 may be wirelessly connected to at least one of the end devices 126-129 via a wireless communication link.

The antenna hub device 124 is operably (e.g., communicatively) connected to multiple antennas 131, 132, 133 mounted on the top of the fuselage 104 along an exterior surface 135 of the fuselage 104. In a non-limiting example, the antennas 131-133 can represent a first antenna 131 associated with the two voice communication radios 126, 127, a second antenna 132 associated with the GPS receiver 128, and a third antenna 133 associated with the transponder 129. The antenna hub device 124 is disposed relatively close to the antennas 131-133, such as within five meters of the antennas 131-133. The antenna hub device 124 may be individually connected to each of the antennas 131-133 via electrically conductive elements 134, such as coaxial cables, copper wires, Ethernet cables, electrically conductive bus bars, circuit boards, and/or the like. In an embodiment, the electrically conductive elements 134 are coaxial cables.

The centralized hub device 122, optical cable 120, and antenna hub device 124 of the vehicle communication system 100 convey signals between the end devices 126-129 and the antennas 131-133. The vehicle communication system 100 can provide bidirectional communications including outgoing signals from the end devices 126-129 to the antennas 131-133 and incoming signals from the antennas 131-133 to the end devices 126-129. In an embodiment, the transmission of outgoing signals begins with the receipt of RF signals at the centralized hub device 122 from the end devices 126-129. The centralized hub device 122 may receive a different respective RF signal from multiple end devices, such as, for example, all four end devices 126-129 shown in FIG. 1. The RF signals may have different frequencies based on the different types of end devices. For example, if the first voice communication radio 126 may generate high frequency (HF) RF signals, and the second voice communication radio 127 may generate very high frequency (VHF) RF signals at a higher frequency range than the HF RF signals.

The centralized hub device 122 converts the received RF signals to respective optical carrier signals. For example, the individual RF signals are used by the centralized hub device 122 to modulate light provided by a light source, such as a laser diode. The optical carrier signals are transmitted by the centralized hub device 122 along the optical cable 120 as a combined optical signal. For example, the optical carrier signals are multiplexed onto the same optical cable 120. In the combined optical signal, the individual optical carrier signals are transmitted at different, non-overlapping wavelength bands of light. In an embodiment, the centralized hub device 122 transmits the combined optical signal via total internal reflection within a single optical fiber of the optical cable 120. The multiplexing enables information (e.g., data, messages, and the like) from multiple end devices to be communicated as a single message via a single optical fiber.

The outgoing combined optical signal is transmitted via the optical cable 120 to the antenna hub device 124. The antenna hub device 124 receives the combined optical signal and converts the optical carrier signals thereof back to RF signals. For example, the antenna hub device 124 may split or partition the combined optical signal into the constituent optical carrier signals based on the different wavelength bands of the combined optical signal. Then, each of the optical carrier signals may be converted to a respective RF signal. The antenna hub device 124 amplifies the RF signals and transmits the RF signals to the corresponding antennas 131-133. For example, the antenna hub device 124 may determine that the source of a first RF signal from the outgoing combined RF signal is the first voice communication radio 126. Based on the determined source, the antenna hub device 124 transmits the first RF signal to the first antenna 131 that is associated with the first voice communication radio 126.

Furthermore, the antenna hub device 124 may determine tuning and amplification properties for the first RF signal based on the determined source. The antenna hub device 124 may determine that a source of a second RF signal received from the combined optical signal is the transponder 129 and transmits the second RF signal to the associated third antenna 133 based on the determination. The antenna hub device 124 may amplify the RF signals received from the combined optical signal different amounts (e.g., to different energy levels) based on characteristics of the communication source (e.g., the respective end device that generated the original RF signal), characteristics of the antenna that receives the RF signal, and/or characteristics of the communication destination that receives the wireless signal from the respective antenna. In a non-limiting example, the antenna hub device 124 may amplify the first RF signal more than the second RF signal. The antennas 131-133 receive the corresponding RF signals via the electrically conductive elements 134 and convert the electrical energy of the RF signals to radio waves. At least some of the radio waves are remotely communicated to off-board devices located at dispatch facilities, other aircraft, aviation monitoring facilities, and the like.

Incoming messages to the aircraft 102 can be received by the antennas 131-133 and communicated by the vehicle communication system 100 to the end devices 126-129 for analysis and processing of the received messages. The process is essentially the reverse of the process for transmitting outgoing messages to the antennas 131-133. For example, the antennas 131-133 receive RF signals as radio waves and convert the radio waves to electrical current transmitted via the electrically conductive elements 134 to the antenna hub device 124. The antenna hub device 124 converts the RF signals to optical carrier signals and multiplexes the optical carrier signals to form an incoming combined optical signal. The combined optical signal is transmitted via the optical cable 120 to the centralized hub device 122, which converts the combined optical signal back to RF signals that are directed to different appropriate end devices 126-129.

The optical cable 120 communicates optical signals over distances at greater energy efficiency and quality than the communication of electrical signals via conventional copper wires due to the low loss properties and insusceptibility to electrical noise and interference. The use of the optical communication pathway allows the end devices 126-129 to be disposed on the aircraft 102 at a location that is convenient for the operation of the end devices 126-129 without requiring the end devices 126-129 to be within close proximity of the associated antennas 131-133. For example, the end devices 126-129 may be located relatively far apart from the antennas 131-133 in an equipment compartment 136 of the aircraft 102. The optical cable 120 may extend any distance between the centralized hub device 122 and the antenna hub device 124. In a non-limiting example, the distance is at least 30 meters. Optionally, the optical cable 120 may extend hundreds of meters between the hub devices 122, 124 without experiencing significant (e.g., noticeable) signal degradation or loss (which is unachievable with coaxial cables). The optical cable 120 can be routed along the structural components of the aircraft 102, such as the floor 110 and one or more partition walls 118.

The equipment compartment 136 is optionally a space within the cargo hold 108. There may be more available space for the end devices 126-129 in the cargo hold 108 than above the passenger section 114 proximate to the antennas 131-133. Furthermore, the end devices 126-129 may be conveniently accessible in the compartment 136 for installation and maintenance. The equipment compartment 136 may be controlled to provide desirable environmental conditions for the end devices 126-129, such as a controlled temperature, pressure, and humidity. The equipment compartment 136 may also include at least one coolant source 138 that directs a coolant (e.g., air, another gas, or a liquid) towards the end devices 126-129 to absorb and dissipate heat. The coolant source 138 may include or represent a vent connected to the onboard environmental control system (ECS), a fan, a liquid cooling system that includes a pump to propel a liquid coolant, or the like. The end devices 126-129 may be mounted along an instrument rack 140 within the compartment 136.

The vehicle communication system 100 is not limited to use with the aircraft 102 shown in FIG. 1 and can be installed on aircraft having different arrangements of compartments than shown in FIG. 1. The vehicle communication system 100 can also be installed on other types of aviation vehicles, such as other types of aircraft, space shuttles, and the like. Furthermore, the vehicle communication system 100 can also be used on non-aviation vehicles, such as automobiles, busses, road-based trucks, rail vehicles, marine vessels, off-road trucks (e.g., for mining or logging), and the like.

Figure 2:
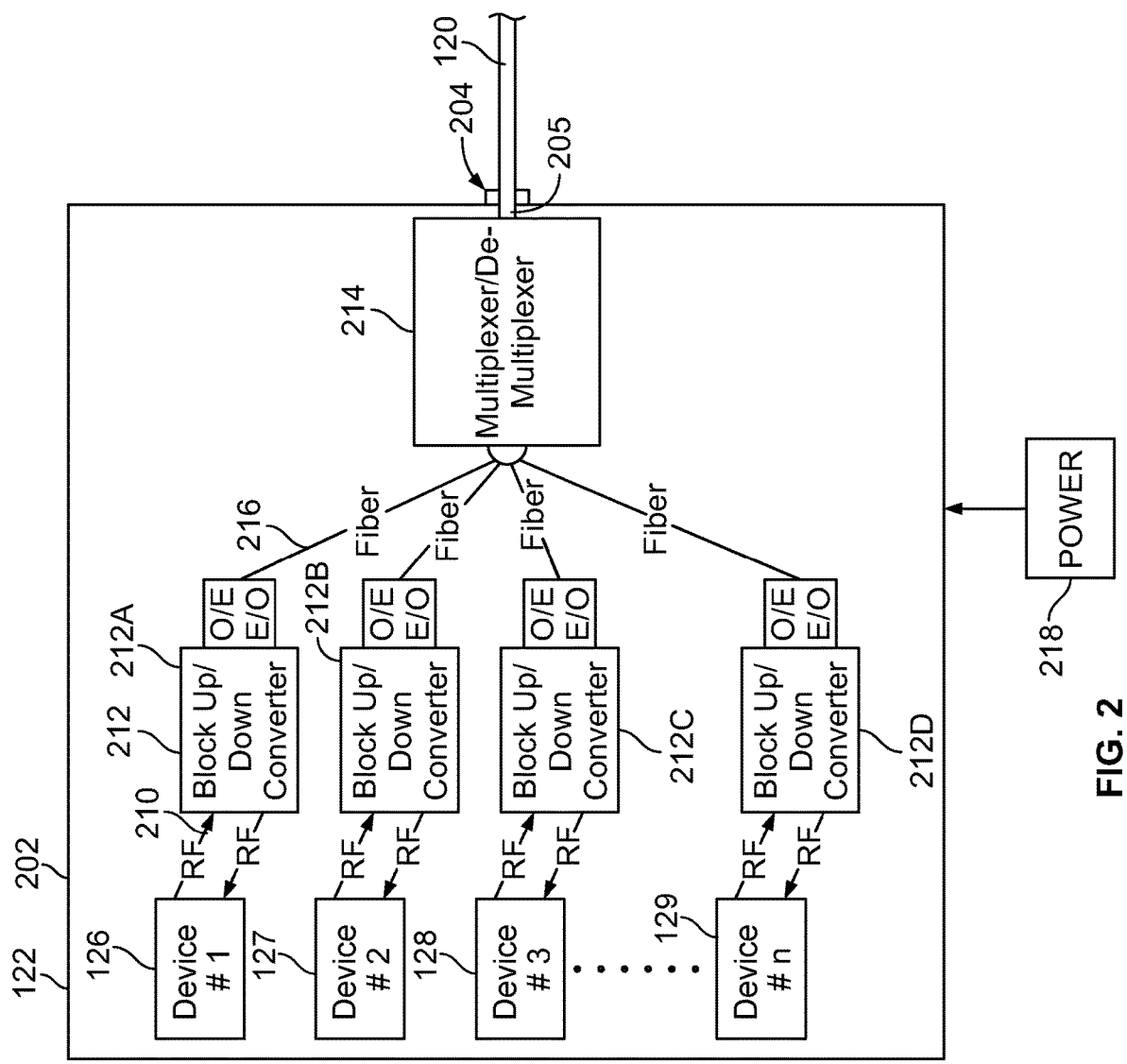
FIG. 2 is a schematic diagram of a centralized hub device of the vehicle communication system according to an embodiment.

FIG. 2 is a schematic diagram of the centralized hub device 122 of the vehicle communication system 100 according to an embodiment. The centralized hub device 122 includes a housing 202 that holds multiple electrical devices (e.g., components) and associated circuitry. The housing 202 includes an optical port 204 that is configured to be connected to the optical cable 120. In FIG. 2, a first end 205 of the optical cable 120 is connected to the optical port 204. In the illustrated embodiment, the centralized hub device 122 includes multiple end devices, such as the end devices 126-129. The centralized hub device 122 may include or be communicatively coupled to more or less than four end devices in other embodiments. The centralized hub device 122 may allow for adding, subtracting, and substituting the end devices as desired to correspond to the specific communication technologies utilized on the respective vehicle (e.g., the aircraft 102). The centralized hub device 122 is connected to a power source 218 that provides electrical energy to power the various components within the housing 202. The end devices 126-129 are disposed within the housing 202 in the illustrated embodiment but may be outside of the housing 202 and communicatively coupled to the centralized hub device 122 in an alternative embodiment, such as shown in FIG. 1.

The end devices 126-129 are connected to converters 212 that convert the RF signals received from the end devices 126-129 from electric current to light. In the illustrated embodiment, each of the end devices 126-129 is connected via a respective electrically conductive element 210 to a different corresponding converter 212A-D. The elements 210 may be insulated wires (e.g., Ethernet), RF waveguides, conductive traces along a circuit board, or the like. The converters 212A-D may be block up/down converters that are configured to modulate signals from optical to electrical and from electrical to optical. For example, the converters 212A-D may include respective light sources, such as laser diodes, that function as optical carriers. The converters 212A-D have electrical-to-optical modulator circuitry to modulate the light beams generated by the respective light sources using the received RF signals. In an embodiment, each of the four illustrated converters 212A-D receives an RF signal from the associated one of the end devices 126-129 and converts the RF signal to an optical carrier signal.

The centralized hub device 122 includes a multiplexer-demultiplexer 214 that is communicatively connected to the converters 212A-D via different optical fibers 216. The multiplexer-demultiplexer 214 receives the four optical carrier signals from the converters 212A-D and consolidates or aggregates the optical carrier signals into a combined optical signal. In an embodiment, the multiplexer-demultiplexer 214 includes multiple wavelength-converting transponders that receive the optical carrier signals and re-transmit the optical carrier signals in different designated wavelength bands of a combined optical signal. The wavelength bands are non-overlapping. The wavelength bands may be designated based on the source of the signals. Optionally, the multiplexer-demultiplexer 214 may also provide amplification of the combined optical signal.

In an embodiment, the multiplexer-demultiplexer 214 combines the four optical carrier signals for transmission by the optical cable 120 by re-transmitting the four optical carrier signals in different corresponding wavelength bands. In a non-limiting example, the combined optical signal may include light having four different colors representing the four optical carrier signals. For example, all optical carrier signals received from the converter 212A that is connected to the first end device 126 are re-transmitted within a first wavelength band. All optical carrier signals received from the converter 212B that is connected to the second end device 127 are re-transmitted within a second wavelength band that is different from the first wavelength band. All optical carrier signals received from the converters 212C and 212D that are connected to the third and fourth end devices 128, 129, respectively, are re-transmitted within respective third and fourth wavelength bands. In a non-limiting example, the first wavelength band can be from 800 nm to 999 nm, the second wavelength band from 1000 nm to 1199 nm, the third wavelength band from 1200 nm to 1399 nm, and the fourth wavelength band from 1400 nm to 1599 nm. Upon receiving an optical carrier signal from the converter 212B via the respective fiber 216, the multiplexer-demultiplexer 214 can identify the converter 212B as the direct source of the optical carrier signal. The converter 212B is communicatively connected to and associated with the second end device 127. The multiplexer-demultiplexer 214 may implement programmed instructions that instruct the multiplexer-demultiplexer 214 to re-transmit the optical carrier signals received from the converter 212B as optical signals within the second wavelength band. The multiplexer-demultiplexer 214 then re-transmits the optical signal as light with a wavelength in the range from 1000 nm to 1199 nm. Although wavelength is described herein, the bands in the combined optical signal can be characterized based on frequency instead of wavelength because the velocity of the carrier wave through the optical fiber is substantially uniform.

The combined optical signal is transmitted through the optical cable 120 to the antenna hub device 124. In an alternative embodiment, the individual converters 212A-D are controlled to initially generate the optical carrier signals to have wavelengths within the corresponding designated wavelength bands. For example, the first converter 212A automatically modulates a received RF signal from the first end device 126 to generate an optical carrier signal that has a wavelength within the first designated wavelength band (e.g., from 800 nm to 999 nm), and the other converters 212B-D similarly operate to generate respective optical carrier signals within the different corresponding wavelength bands. In this embodiment, the multiplexer-demultiplexer 214 receives the optical carrier signals in the different wavelength bands and merely combines the optical carrier signals into the combined optical signal onto the optical fiber of the optical cable 120 (without modifying or re-transmitting the optical carrier signals).

Although the centralized hub device 122 is illustrated with four sets of end devices 126-129 and converters 212A-D, the centralized hub device 122 can have more or less than four sets of end devices and converters in other embodiments.

Figure 3:
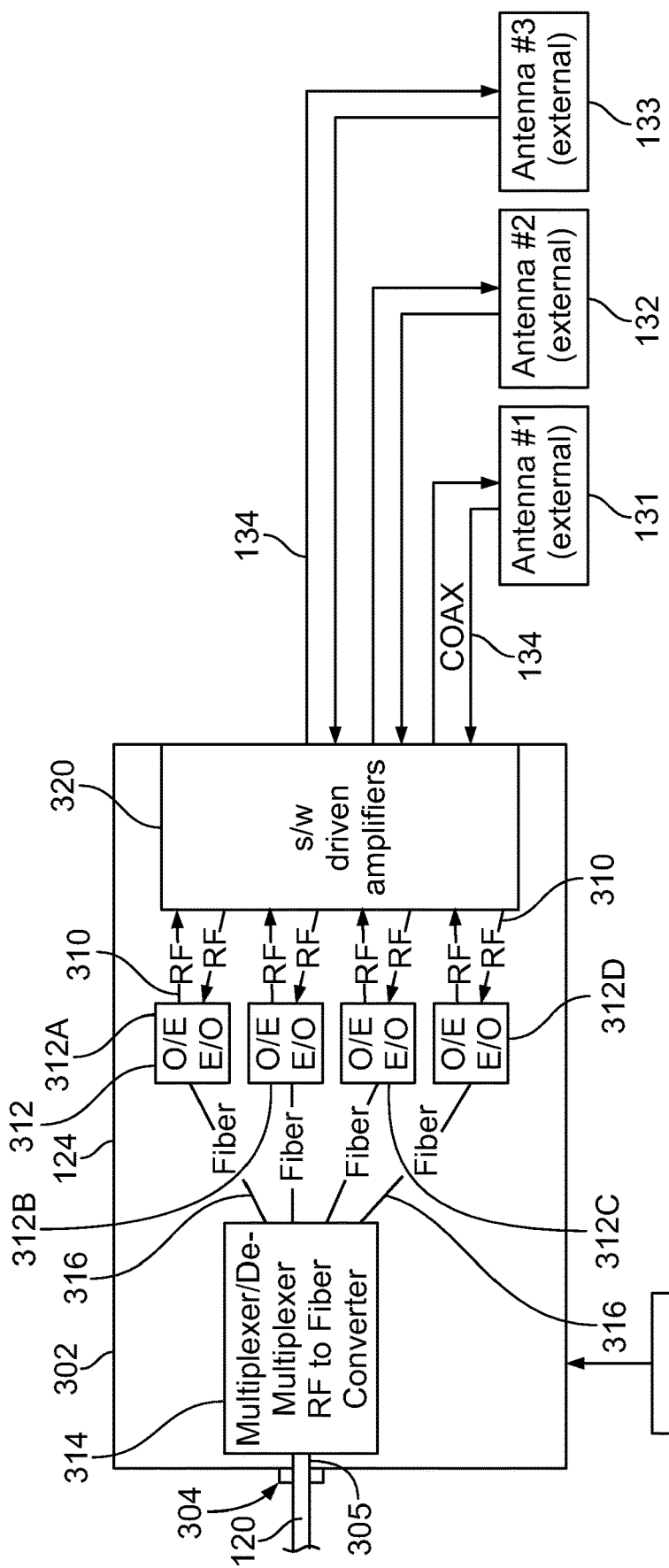
FIG. 3 is a schematic diagram of an antenna hub device of the vehicle communication system according to an embodiment.

FIG. 3 is a schematic diagram of the antenna hub device 124 of the vehicle communication system 100 according to an embodiment. The antenna hub device 124 has some similar components as the centralized hub device 122 which enables the vehicle communication system 100 to provide bidirectional RF over fiber communications. The antenna hub device 124 includes a housing 302 that has an optical port 304 configured to be connected to the optical cable 120. A second end 305 of the optical cable 120, opposite the first end 205 shown in FIG. 2, is connected to the optical port 304. In the illustrated embodiment, the antenna hub device 124 includes a multiplexer-demultiplexer 314, multiple converters 312, and a set of amplifiers 320. The antenna hub device 124 in the illustrated embodiment includes four converters 312A-D which correspond to the different designated wavelength bands. The converters 312A-D are communicatively connected to the multiplexer-demultiplexer 314 via different respective optical fibers 316. The antenna hub device 124 is connected to a power source 318 that provides electrical energy to power the various components within the housing 302, such as the amplifiers 320.

The multiplexer-demultiplexer 314 may be the same type of component as the multiplexer-demultiplexer 214 of the centralized hub device 122. The multiplexer-demultiplexer 314 receives the combined optical signal from the optical cable 120 and splits or partitions the optical signal into the constituent optical carrier signals. The optical signal may be partitioned based on the different designated wavelength bands. The multiplexer-demultiplexer 314 may be programmed to analyze the received combined optical signal for wavelengths of the signal within the different wavelength bands. If, for example, a portion of the signal has a wavelength of 860 nm, the multiplexer-demultiplexer 314 can determine that the wavelength is in the first designated wavelength band (e.g., from 800 nm to 999 nm). The multiplexer-demultiplexer 314 then transmits the portion as an optical carrier signal to the corresponding converter 312 that is associated with the first designated wavelength band (e.g., the first converter 312A). Similarly, any portions of the combined optical signal within the second, third, and fourth wavelength band are split and transmitted by the multiplexer-demultiplexer 314 to the corresponding converters 312 (e.g., converters 312B-D) that are associated with each of the second, third, and fourth bands.

The converters 312A-D are configured to convert the optical carrier signals received from the multiplexer-demultiplexer 314 to RF signals. The converters 312A-D may include photodiodes that generate the RF signals based on absorption of photons from the received optical carrier signals. The converters 312A-D may be the same or similar to the converters 212A-D of the centralized hub device 122 (shown in FIG. 2). The converters 312A-D may be bidirectional with circuitry for converting optical signals to electrical signals and converting electrical signals to optical signals.

The set of amplifiers 320 is connected to each of the converters 312A-D via a different discrete electrically conductive element 310. The elements 310 may be coaxial cables, RF waveguide, Ethernet, conductive traces along a circuit board, or the like. The amplifiers 320 receive the RF signals from the converters 312A-D and utilize power received from the power source 318 to increase the energy level (e.g., amplitude) of at least some of the RF signals. The amplifiers 320 may be driven by switches. The set of amplifiers 320 is connected to the antennas 131-133 via the electrically conductive elements 134. For example, the elements 134 may be coaxial cables that extend from the housing 302 to the different corresponding antennas 131-133. Each of the antennas 131-133 may be connected to the set of amplifiers 320 via one or two dedicated coaxial cables through a corresponding port on the housing 302. After amplifying the RF signals, the set of amplifiers 320 relays the received RF signals to different appropriate antennas 131-133. In a non-limiting example, the amplifiers 320 may be wired and/or programmed to relay RF signals received from the first converter 312A and from the second converter 312B to the first antenna 131, to relay RF signals received from the third converter 312C to the second antenna 132, and to relay RF signals received from the fourth converter 312D to the third antenna 133. The antenna hub device 124 can be connected to more or less than three antennas 131-133 in other embodiments.

In an embodiment, the antenna hub device 124 is configured to tune and amplify the received RF signals in different ways based on the source of each respective RF signal and/or the antenna that receives the RF signal. The set of amplifiers 320 may amplify a first RF signal of the RF signals more than at least another of the RF signals. For example, because the RF signals may be communicated to different off-board receiver devices at different locations, signals that are communicated longer distances, that carry more information, and/or that have higher signal quality standards may require more energy than signals that are communicated shorter distances, that carry less information, and/or that have lower signal quality standards. In a non-limiting example, the set of amplifiers 320 may be programmed to amplify RF signals received from the first converter 312A more than RF signals received from the second converter 312B, or vice-versa.

FIGS. 2 and 3 describe the vehicle communication system 100 being used to transmit outgoing signals from the end devices 126-129 to the antennas 131-133 for off-board communication. For example, the combined optical signal is an outgoing combined optical signal that is communicated from the centralized hub device 122 to the antenna hub device 124. The vehicle communication system 100 is bidirectional and can transmit incoming RF signals received from the antennas 131-133 from off-board sources to the end devices 126-129 for processing of the incoming RF signals. The off-board sources of RF signals can be satellites, ground-based antennas, cellular towers, other vehicles, and/or the like. The process for transmitting the incoming RF signals is similar to, and essentially the reverse of, the outgoing process described above. For example, the antenna hub device 124 receives multiple RF signals from the one or more antennas 131-133 via the electrical cables 134, converts the RF signals to respective optical carrier signals (via the converters 312A-D), and consolidates the optical carrier signals into an incoming combined optical signal (via the multiplexer-demultiplexer 314). The antenna hub device 124 transmits the incoming combined optical signal through the optical cable 120 to the centralized hub device 122. The incoming combined optical signal may be transmitted through a single fiber of the optical cable 120, and the single fiber may be the same fiber that is used to transmit the outgoing combined optical signal. The centralized hub device 122 receives the incoming optical signal, splits or partitions the signal into constituent optical carrier signals (via the multiplexer-demultiplexer 214), converts the optical carrier signals to RF signals (via the converters 212A-D), and relays the RF signals to the appropriate end devices 126-129 and the electrically conductive elements 130.

Figure 4:
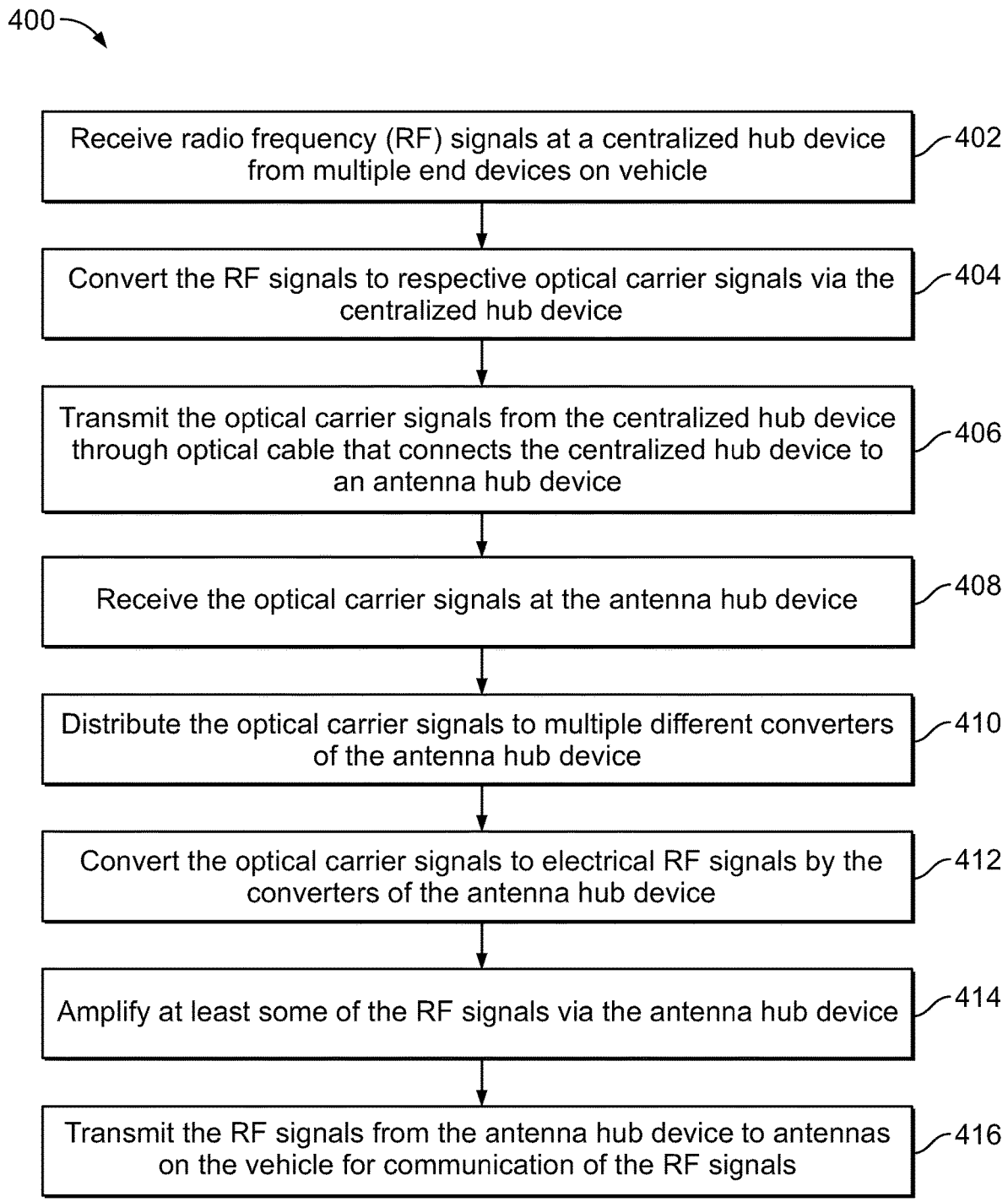
FIG. 4 is a flow chart of a method for communicating signals onboard a vehicle according to an embodiment.

FIG. 4 is a flow chart of a method 400 for communicating signals onboard a vehicle according to an embodiment. The method 400 is performed by the vehicle communication system 100 shown in FIGS. 1-3. Optionally, the method 400 may include more steps than shown in FIG. 4, fewer steps than shown in FIG. 4, different steps that are not shown in FIG. 4, and/or a different arrangement or order of the steps than shown in FIG. 4.

The method 400 begins at 402, at which radio frequency (RF) signals are received at a centralized hub device from multiple end devices on the vehicle. At 404, the RF signals are converted by the centralized hub device to respective optical carrier signals. The optical carrier signals at 406 are transmitted from the centralized hub device through an optical cable that is connected to both the centralized hub device and an antenna hub device. The optical carrier signals are transmitted through a single optical fiber of the optical cable at different designated wavelength bands. For example, a first optical carrier signal (generated based on an RF signal received from a first end device) is transmitted within a first designated wavelength band, and a second optical carrier signal (generated based on an RF signal received from a second end device) is transmitted within a second designated wavelength band that does not overlap the first wavelength band. By modulating the wavelengths within the different bands, the optical carrier signals transmitted through the fiber may have different colors (e.g., if in the visible range). The optical carrier signals transmitted through the fiber may be collectively referred to as a combined optical signal.

At 408, the combined optical signal (e.g., the multiple carrier signals) is received at the antenna hub device. At 410, the optical carrier signals received at the antenna hub device from the optical cable are distributed to multiple different converters of the antenna hub device. The optical carrier signals are distributed to the different converters based on the designated wavelength bands. At 412, the optical carrier signals are converted to electrical RF signals by the associated converters of the antenna hub device.

At 414, at least some of the RF signals are amplified by the antenna hub device. Optionally, the antenna hub device may be wired or programmed to amplify a first RF signal more than at least another of the RF signals based on the end device that is the source of the first RF signal and/or the associated antenna to which the first RF signal is transmitted. At 416, the RF signals are transmitted from the antenna hub device to different corresponding antennas on the vehicle for communication of the RF signals. The antennas may convert the electrical signals to radio waves that are communicated to off-board receiver devices located at ground-based antennas (e.g., at dispatch facilities, weather centers, or the like), satellites, cellular towers, onboard other vehicles, and/or the like.

Optionally, the method 400 includes positioning the antenna hub device within five meters of the antennas, positioning the centralized hub device any distance (e.g., such as at least 30 meters) from the antenna hub device, and routing the optical cable through the vehicle to connect the centralized hub device and the antenna hub device. The low loss properties and insusceptibility to noise and interference enable relatively large distances between the end devices and the antennas. Optionally, the method 400 also includes positioning the centralized hub device with the end devices within an equipment compartment of the vehicle. The equipment compartment has controlled environmental conditions (e.g., temperature, pressure, humidity, and the like) and includes a coolant source that flows a coolant to dissipate heat from the end devices.

While various spatial and directional terms, such as top, bottom, lower, mid, lateral, horizontal, vertical, front and the like are used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

The diagrams of embodiments herein illustrate circuits, circuitry, and/or portions thereof that are implemented as hardware with associated instructions (e.g., software stored on a tangible and non-transitory computer readable storage medium, such as a computer hard drive, ROM, RAM, or the like) that perform the operations described herein. The hardware can include state machine circuitry hardwired to perform the functions described herein. The hardware can include electronic circuits that include and/or are connected to one or more logic-based devices, such as microprocessors, processors, controllers, or the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are example embodiments. Many other embodiments will be apparent to those of ordinary skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those of ordinary skill in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A vehicle communication system comprising:
an optical cable disposed on an aircraft;
a centralized hub device including an optical port, multiple converters, and a multiplexer/demultiplexer, the optical port connected to a first end of the optical cable, wherein each of the converters is operably connected to a corresponding end device of multiple end devices on the aircraft, the converters configured to receive radio frequency (RF) signals from the end devices and to convert the RF signals to respective optical carrier signals,
the multiplexer/demultiplexer including multiple wavelength-converting transponders that receive the optical carrier signals from the converters, modify the optical carrier signals, and re-transmit the optical carrier signals along the optical cable at different, non-overlapping wavelength bands of a combined optical signal, wherein the multiplexer/demultiplexer is configured to identify a source of each of the optical carrier signals, and the wavelength-converting transponders re-transmit each of the optical carrier signals at a corresponding wavelength band of the different, non-overlapping wavelength bands in the combined optical signal based on the source of the respective optical carrier signal; and
an antenna hub device including an optical port connected to a second end of the optical cable, the antenna hub device operably connected to one or more antennas mounted along an exterior surface of the aircraft, wherein the antenna hub device is configured to receive the combined optical signal and convert the optical carrier signals thereof to RF signals, amplify the RF signals, and transmit the RF signals to the one or more antennas,
wherein the antenna hub device includes multiple converters and a multiplexer/demultiplexer, the multiplexer/demultiplexer of the antenna hub device configured to partition the combined optical signal into the optical carrier signals, the converters of the antenna hub device configured to convert the optical carrier signals received from the multiplexer/demultiplexer to the RF signals,
wherein the antenna hub device is configured to control a set of amplifiers to vary amplification of the RF signals based on which of the converters of the antenna hub device generated each respective RF signal, wherein the set of amplifiers are controlled to amplify the RF signals received from a first converter of the antenna hub device more than the RF signals received from a second converter of the antenna hub device.

2. The vehicle communication system of claim 1, wherein the centralized hub device is configured to re-transmit the optical carrier signals at the different, non-overlapping wavelength bands along a single, common optical fiber of the optical cable such that information from multiple end devices is communicated via the same optical fiber.

3. The vehicle communication system of claim 1, wherein the antenna hub device is configured to partition the combined optical signal that is received into the optical carrier signals based on the different, non-overlapping wavelength bands of the combined optical signal.

4. The vehicle communication system of claim 1, wherein the antenna hub device is located within five meters of the one or more antennas and is operably connected to the one or more antennas via one or more electrically conductive elements.

5. The vehicle communication system of claim 1, wherein the optical cable extends a distance of at least 30 meters between the centralized hub device and the antenna hub device.

6. The vehicle communication system of claim 1, wherein the combined optical signal is an outgoing combined optical signal, and the antenna hub device is configured to receive multiple RF signals from the one or more antennas, convert the RF signals to respective optical carrier signals and consolidate the optical carrier signals into an incoming combined optical signal that is transmitted through the optical cable to the centralized hub device.

7. The vehicle communication system of claim 1, wherein each of the optical carrier signals corresponds to a different individual RF signal of the RF signals received from the end devices.

8. The vehicle communication system of claim 1, wherein, for each of the optical carrier signals, the multiplexer/demultiplexer of the centralized hub device is configured to identify one of the converters, one of the end devices operably connected to the converters, or both one of the converters and one of the end devices as the source of the optical carrier signal.

9. The vehicle communication system of claim 1, wherein the multiplexer/demultiplexer of the centralized hub device is configured to identify a first converter of the converters as the source of a first optical carrier signal and to identify a second converter of the converters as the source of a second optical carrier signal, the wavelength-converting transponders of the multiplexer/demultiplexer configured to re-transmit the first optical carrier signal within a first wavelength band of the combined optical signal and to re-transmit the second optical carrier signal within a second wavelength band of the combined optical signal, the first wavelength band associated with the first converter and the second wavelength band associated with the second converter.

10. The vehicle communication system of claim 1, wherein the aircraft includes a fuselage that defines an interior cabin comprising a passenger section, the centralized hub device is disposed below a floor of the interior cabin, the antenna hub device is disposed above the interior cabin, and the one or more antennas are mounted at a top of the fuselage.

11. The vehicle communication system of claim 10, wherein the optical cable is routed from the centralized hub device along one or more of the floor of the interior cabin or a partition wall within the interior cabin to the antenna hub device.

12. A method for communicating signals onboard an aircraft, the method comprising:
receiving radio frequency (RF) signals at a centralized hub device from multiple end devices on the aircraft;
converting the RF signals to respective optical carrier signals via the centralized hub device;
identifying a respective source of each of the optical carrier signals, wherein the identifying operation includes identifying the source of a first optical carrier signal as a first converter of multiple converters of the centralized hub device, the first converter operably connected to a first end device of the end devices;
modifying and re-transmitting the optical carrier signals at different, non-overlapping wavelength bands of a combined optical signal, via multiple wavelength-converting transponders of the centralized hub device, based on the respective source of each of the optical carrier signal such that the first optical carrier signal is re-transmitted at a first wavelength band that is associated with the first converter;
transmitting the combined optical signal through an optical cable that is connected to both the centralized hub device and an antenna hub device;
receiving the optical carrier signals that are transmitted from the centralized hub device at the antenna hub device;
converting, via multiple converters of the antenna hub device, the optical carrier signals at the different, non-overlapping wavelength bands to RF signals;
varying amplification of the RF signals based on which of the converters of the antenna hub device generated each respective RF signal, wherein the RF signals generated by a first converter of the antenna hub device are amplified more than the RF signals converted by a second converter of the antenna hub device; and
transmitting the RF signals that are amplified from the antenna hub device to different corresponding antennas on the aircraft for communication of the RF signals, the antennas mounted along an exterior surface of the aircraft.

13. The method of claim 12, further comprising distributing the optical carrier signals received at the antenna hub device from the optical cable to the different converters of the antenna hub device based on the different designated wavelength bands.

14. The method of claim 12, further comprising positioning the antenna hub device within five meters of the antennas and positioning the centralized hub device at least thirty meters from the antenna hub device.

15. The method of claim 12, further comprising positioning the centralized hub device with the end devices within an equipment compartment of the vehicle, wherein the equipment compartment has controlled environmental conditions and includes a coolant source.

16. An aircraft comprising:
a fuselage defining an interior cabin that includes a passenger section;
multiple antennas disposed along an exterior surface of the fuselage at a top of the fuselage;
multiple end devices disposed within an equipment compartment of the aircraft located below a floor of the interior cabin; and
a vehicle communication system onboard the aircraft that connects the end devices to the antennas, the vehicle communication system comprising:
an optical cable;
a centralized hub device connected to a first end of the optical cable and disposed within the equipment compartment, the centralized hub device including multiple converters and a multiplexer/demultiplexer, the converters configured to receive radio frequency (RF) signals from the end devices and convert the RF signals to respective optical carrier signals such that each optical carrier signal corresponds to a different individual RF signal of the RF signals from the end devices, the multiplexer/demultiplexer including multiple wavelength-converting transponders that receive the optical carrier signals from the converters, modify the optical carrier signals, and re-transmit the optical carrier signals through a single optical fiber of the optical cable at different designated wavelength bands that are non-overlapping as a combined optical signal; and
an antenna hub device connected to a second end of the optical cable and configured to receive the optical carrier signals from the optical cable, the antenna hub device disposed above the interior cabin and configured to convert the optical carrier signals to RF signals, amplify the RF signals, and transmit the RF signals to the antennas,
wherein the antenna hub device includes multiple converters and a multiplexer/demultiplexer, the multiplexer/demultiplexer of the antenna hub device configured to partition the combined optical signal into the optical carrier signals, the converters of the antenna hub device configured to convert the optical carrier signals received from the multiplexer/demultiplexer to the RF signals,
wherein the antenna hub device is configured to control a set of amplifiers to vary amplification of the RF signals based on which of the converters of the antenna hub device generated each respective RF signal, wherein the set of amplifiers are controlled to amplify the RF signals received from a first converter of the antenna hub device more than the RF signals received from a second converter of the antenna hub device.

17. The aircraft of claim 16, wherein the antenna hub device is configured to amplify the RF signals received from the first converter more than the RF signals received from the second converter based on a particular end device of the end devices that is a source of the RF signals received from the first converter.

* * * * *